Feb. 18, 1941.   O. H. MYERS   2,232,074
MARKING DEVICE
Filed Oct. 31, 1938
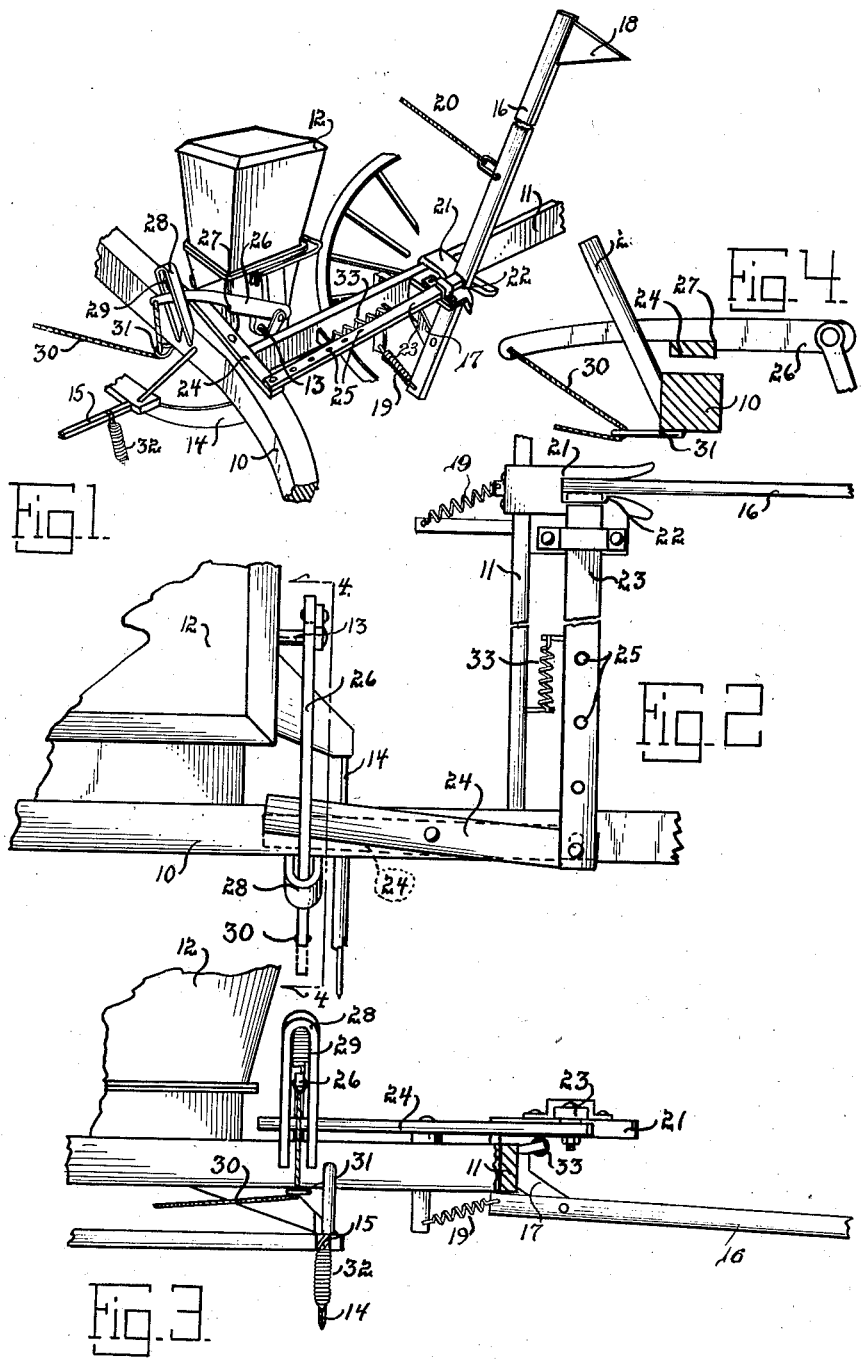
INVENTOR.
O. H. MYERS
BY Maurice J. Fletcher
ATTORNEY.

Patented Feb. 18, 1941

2,232,074

UNITED STATES PATENT OFFICE 2,232,074

MARKING DEVICE

Ola H. Myers, Central City, Iowa

Application October 31, 1938, Serial No. 237,961

6 Claims. (Cl. 111—25)

The principal object of this invention is to provide a marking device particularly adapted for use on wireless corn planters and like machinery that accurately marks the last hill of corn or like grain planted for guidance of the machine and operator in beginning the next row of planting.

More specifically the object of my device is to assure uniformity of planting with a self-contained machine.

A further object of my invention is to provide a marking means for use with corn planters and the like that is easily controlled, rigid in structure and accurate in performing its function.

A still further object of this invention is to provide a marking device for wireless corn planters and the like that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a perspective view of a portion of a corn planter or like with my marking device installed thereon.

Fig. 2 is an enlarged top plan view of my device installed on the frame of a corn planter with portions of the planter and device broken away.

Fig. 3 is an enlarged front elevational view of my marking device installed on a corn planter with portions of the planter and device broken away for clarity of illustration.

Fig. 4 is an enlarged cross sectional view of the trip lever portion of my marking device and is taken approximately on the line 4—4 of Fig. 2.

One of the principal faults of planting machines wherein a wire or like spacing device is not used, is that there is no practical way of marking the succeeding rows of planting with such a degree of accuracy that all rows of grain will be straight and be spaced at pre-determined exact intervals. Usually this phase is dependent upon the judgment of the operator of the machine and heretofore it has been impossible to mark or space with the rows without the use of a wire with the accuracy necessary in the planting of corn. It is imperative that corn be planted in straight rows to permit its cultivation and a variance in width between rows cannot be tolerated. I have overcome such disadvantages by providing a marking device for use in conjunction with corn planters or like which I will now describe.

Referring to the drawing, I have used the numeral 10 to designate the main cross beam of the frame supporting a corn planting mechanism or the like. The numeral 11 designates one of the side brace beams of a corn planter rigidly secured to the cross beam 10. I have used the numeral 12 to designate the ordinary hopper type of seed container having in conjunction therewith the ordinary timed tripping mechanism 13. As is well known these tripping mechanisms comprise a rock shaft and arm operating the seed feed mechanism and permit the seeds to drop in spaced relationship to the travel of the planting mechanism and it is to this rock shaft and arm that my marking means is operatively connected as will be hereinafter described. The numeral 14 designates the ordinary planting shoe which has at its rearward end a chute in communication with the hopper 12, through the ordinary valve mechanism controlled by the tripping means 13. The numeral 15 designates a common brace rod extending forwardly adjacent the forward tip of the shoe 14. It is to such a planter that I attach my marking mechanism which I will now describe. I have used the numeral 16 to designate a bar or arm pivotally secured to a bracket 17 which in turn is rigidly secured to the side beams 11 as shown in the drawing. Secured to the upper end of the bar 16 is a shovel element or marker 18 whose function is to dig into the earth for marking the beginning of the next row of planted grain. The numeral 19 designates a coil tension spring having one end secured to the bar 16 below the point at which it is pivoted to the bracket 17 and having its other end adequately secured to the frame member or beams 11. The numeral 20 designates a cable or control means for manually pulling the bar 16 to its upper position. I have used the numeral 21 to designate a retaining fork having a notch 22 cut in its forward side as shown in Fig. 2 of the drawing. This retaining fork is for the purpose of holding the bar 16 and marker 18 in a substantially vertical position as shown in Fig. 1 of the drawing and the inherent spring of the bar 16 is such that it engages this notch 22 when pulled upwardly to its normal raised position. The bracket 17 may be disposed at a slight angle to the vertical rod that the bar 16 when pivoting upwardly will travel slightly forward which together with the resiliency or spring of the bar 16 will permit the bar to firmly seat itself in the notch 22 when the bar 16 is in a raised position. I have used the numeral 23 to designate a bar slidably mounted in such a manner as to have one of its end portions adjacent the notch 22 and having its other end pivotally secured to one end of a lever bar 24 which in turn is pivotally secured to the frame member 10 as shown in Fig. 2. The numeral 25 designates a plurality of holes cut in the end of the bar 23 adjacent the lever 24 for permitting adjustment between the bar 23 and the lever 24. I have used the numeral 26 to designate a tripping bar having its rearward end secured by a link or like to the tripping mechanism 13 of the seed hopper 12. This tripping bar 26 is operatively secured to the rock shaft and arm of the seed tripping mechanism so that it will actuate at the same time the seed releasing mechanism releases the seeds therefrom. The numeral 27 designates a notch or sear on the tripping bar 26. The numeral 28 designates a U-shaped support member extending upwardly and having its lower ends secured to the frame member 10. The numeral 29 designates a tension spring having one end secured to the upper end of the support 28 and its other end secured to the trip bar 26 as shown in the drawing. I have used the numeral 30 to indicate a rope, cable or the like, having one end secured to the free end of the trip bar 26 and extending through a guide ring 31 for the purpose of manually pivoting the trip bar 26 so that the notch or sear 27 can contact the free end of the lever 24 when desired by the operator. The rope 30 has its other end yieldingly engaged by the hand of the operator. In this way the bar 26 is free to move without counteracting stress so that the member 26 may perform its function of moving the lever 24. I have used the numeral 32 to indicate a pointer or sighting marker secured to the brace rod 15 and extending downwardly forward of the shovel or shoe 14. This pointer element is flexible and its function will hereinafter be explained. I have used the numeral 33 to designate a tension spring having one of its ends secured to the bar 23 and its other end secured to the frame 11 for yieldingly holding the bar 23 in one of its positions.

The practical operation of my device is as follows: The ropes or cables 20 and 30 are either operated by the operator of the planter directly or through the use of a common lever. Before the last hill of corn in a given row is planted, the trip bar 26 is pulled downwardly by the operator so that as a last hill of corn is tripped, the sear 27 engages one end of the lever 24 pivoting this lever, thereby actuating the bar 23 as shown by dotted lines in Fig. 2. This pushes the marking bar 16 out of engagement with the notch 22 of the fork or retaining member 21. In other words this retaining member serves as a catch element. The tension of the spring 19 will then pivot or pull the bar 16 to the position shown in Figs. 2 and 3, causing the marker blade 18 to dig into the earth, thus marking the exact location desired for the starting of the next row. After the marking assembly has performed this function, it is again pulled to a substantially upright position and into engagement with the notch 22. After the planting machine has been turned around to start on the next succeeding row, the operator merely watches until the pointer 32 is at the mark made by the point 18 and then trips the seeding mechanism so that it will start planting and both the lateral and longitudinal rows will then be assured of alignment. To insure this alignment, the pointer 32 is placed the same distance in advance of the point of seed deposit as the marker is behind this point so that when the pointer, on the return trip, is set over the mark made by the planting of the last hill of the previous row, the points of seed deposit will be laterally aligned. It will here be noted and is generally known, that the planting mechanism is shut off during the rotation or the turning around of the planting machine. After the sear 27 has engaged the lever 24, and the cable 30, is released, the spring 29 returns the trip bar 26 to its normal upwardly position where it does not contact the lever 24 during the operation of the planter. The spring 33 thus returns the bar assembly 23 and lever 24 to its normal position. Thus it will be seen that I have provided a marking device which accurately marks the beginning of the next row of planting and permits the accurate and positive alignment of the machine during its successive planting operation. My device fulfills all of my objects and presents many other obvious advantages. Obviously on a planting machine one of these markers may be used on either side of the machine.

Some changes may be made in the construction and arrangement of my improved marking device without departing from the real spirit and purpose of my invention, and it is my intention to cover by my claims any modified forms of structure or use of mechanical equivalents which may be reasonably included within their scope.

I claim:

1. In combination with a planting mechanism having a frame, a seed hopper on said frame, and a mechanism for feeding seed from said seed hopper, a marking device comprising, a marker arm pivotally secured to said frame, a catch member rigidly secured to said frame and capable of receiving and holding said marker, and a means for operatively connecting said seed hopper mechanism with said marker arm for selectively disengaging said catch at times.

2. In combination with a wireless corn planter having a frame, a seed hopper on said frame, a mechanism for feeding seed from said seed hopper, a marker comprising, a marker arm pivotally secured to said frame, a catch rigidly secured to said frame and capable of receiving said marker arm, a bar slidably mounted adjacent said catch for removing said marker arm from engagement with said catch, a lever pivotally mounted on said frame having one end in pivotal engagement with one end of said bar, a trip bar having one end operatively connected with the seed hopper mechanism and capable of being manually selectively engaged with one end of said lever at times, said trip bar being normally held out of engagement with said lever, and means for holding said trip bar in its normal position.

3. In combination with a planting device having a frame, a seed hopper on said frame, a planting shoe on said frame in communication with said seed hopper, and a tripping mechanism in said seed hopper, a marking device comprising, a marking arm pivoted to said frame, a marking point on one end of said arm, a spring having one of its ends secured to the other end of said arm and its other end to said frame, a fork retaining member secured to said frame, a means for retaining said arm in said retaining member, a bar slidably mounted adjacent said retaining member for releasing said arm from said retaining means, a lever pivotally mounted on said frame and having one end in pivotal engagement with said bar, a trip bar having one end operatively connected with said tripping mechanism and capable of actuating said lever at times, and a means for manually positioning said trip bar for engaging and actuating said lever at times.

4. In combination with a planting device having a frame, a seed hopper on said frame, a planting shoe on said frame in communication with said seed hopper, and a tripping mechanism in said seed hopper, a marking device comprising, a marking bar pivoted to said frame, a marking point on one end of said bar, a spring having one of its ends secured to the other end of said bar and its other end to said frame, a fork retaining member secured to said frame, a means for retaining said bar in said retaining member, a means cooperative with said tripping mechanism for selectively disengaging said bar from said retaining means at times, a means for manually returning said bar to its position to be retained by said retaining member, and a means for manually selectively positioning said cooperative means at times.

5. In combination with a planting device having a frame, a seed hopper on said frame, a planting shoe on said frame in communication with said seed hopper, and a tripping mechanism in said seed hopper, a marking device comprising, a marking arm pivoted to said frame, a marking point on one end of said arm, a spring having one of its ends secured to the other end of said arm and its other end to said frame, a fork retaining member secured to said frame, a means for retaining said arm in said retaining member, a bar slidably mounted adjacent said retaining member for releasing said arm from said retaining means, a lever pivotally mounted on said frame and having one end in pivotal engagement with said bar, a trip bar having one end operatively connected with said tripping mechanism and capable of actuating said lever at times, a means for manually positioning said trip bar for engaging and actuating said lever at times, and a pointer positioned forwardly of said planting shoe and secured to said frame.

6. In combination with a wireless corn planter having a frame, a seed hopper on said frame, a mechanism for feeding seed from said seed hopper, a marker comprising, a marker arm pivotally secured to said frame, a catch rigidly secured to said frame and capable of receiving said marker arm, a lever slidably mounted adjacent said catch for removing said marker arm from engagement with said catch, and a tripping means operatively connected with said seed hopper mechanism for engaging and operating said lever at times.

OLA H. MYERS.